US009884552B2

(12) United States Patent
Sloan et al.

(10) Patent No.: US 9,884,552 B2
(45) Date of Patent: Feb. 6, 2018

(54) VEHICLE FLUID HANDLING SYSTEMS

(71) Applicant: AGILITY FUEL SYSTEMS, LLC, Santa Ana, CA (US)

(72) Inventors: Todd F. Sloan, Kelowna (CA); Chris Forsberg, Kelowna (CA); Joseph Anthony Leduc, West Kelowna (CA); Tobiah R. Halter, West Linn, OR (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 15/476,448

(22) Filed: Mar. 31, 2017

(65) Prior Publication Data

US 2017/0282710 A1    Oct. 5, 2017

Related U.S. Application Data

(60) Provisional application No. 62/317,280, filed on Apr. 1, 2016.

(51) Int. Cl.
*B60K 15/07* (2006.01)
*B60K 15/03* (2006.01)
(Continued)

(52) U.S. Cl.
CPC .............. *B60K 15/07* (2013.01); *B60K 15/01* (2013.01); *B60K 15/03006* (2013.01);
(Continued)

(58) Field of Classification Search
CPC ............ B60K 15/03006; B60K 15/063; B60K 15/067; B60K 15/07; B60K 2015/03118; B60K 2015/03157; B60K 2015/0636; B60K 2015/0637; B60K 2015/0638; F17C 13/083; F17C 13/084; F17C 13/085;
(Continued)

(56) References Cited

U.S. PATENT DOCUMENTS 2,044,039 A * 6/1936 Woodcock ............ E01C 19/172
                                                    137/351
2,632,262 A * 3/1953 Whittey .................. E01H 5/067
                                                    137/351
(Continued)

FOREIGN PATENT DOCUMENTS

KR    2006 0022778    3/2006
WO    WO 2015/191918    12/2015

OTHER PUBLICATIONS

International Search Report and Written Opinion dated Jul. 24, 2017, in Application No. PCT/US2017/025567 (15 pages).

*Primary Examiner* — Michael R Reid
*Assistant Examiner* — Jonathan Waddy
(74) *Attorney, Agent, or Firm* — Knobbe Martens Olson & Bear, LLP

(57) ABSTRACT

A fluid system for a vehicle is provided. The fluid system is configured to couple to a chassis of the vehicle. A frame assembly of the fluid system is configured to couple with the chassis directly or with another component that is coupled, directly or indirectly, with the chassis. A cowling of the fluid system can enclose a fuel pressure vessel and an auxiliary fluid vessel. The auxiliary fluid vessel is configured to be placed in fluid communication with the component powered or operated by the fluid therein.

8 Claims, 15 Drawing Sheets

(51) Int. Cl.
  *B60K 15/063* (2006.01)
  *F17C 13/08* (2006.01)
  *B60K 15/01* (2006.01)

(52) U.S. Cl.
  CPC .... *F17C 13/084* (2013.01); *B60K 2015/0321* (2013.01); *B60K 2015/03157* (2013.01); *B60K 2015/03256* (2013.01); *B60K 2015/0636* (2013.01); *F17C 2201/0109* (2013.01); *F17C 2201/035* (2013.01); *F17C 2201/056* (2013.01); *F17C 2205/013* (2013.01); *F17C 2205/0107* (2013.01); *F17C 2205/0332* (2013.01); *F17C 2205/0335* (2013.01); *F17C 2205/0338* (2013.01); *F17C 2221/033* (2013.01); *F17C 2265/066* (2013.01); *F17C 2270/0171* (2013.01); *F17C 2270/0184* (2013.01); *F17C 2270/0554* (2013.01); *F17C 2270/0563* (2013.01)

(58) Field of Classification Search
  CPC .............. F17C 13/08; F17C 2205/0107; F17C 2205/013; F17C 2205/00; F17C 2205/01; F17C 2205/0103; F17C 2205/0153; F17C 2205/0157; F17C 2205/0161; F17C 2205/0169; F17C 2205/0142; F17C 2205/034; F17C 2205/0123; F17C 2221/033; F17C 2265/066; F17C 2270/0171; F17C 2270/0184; F17C 2270/0554; F17C 2270/0563
  USPC ....... 137/255, 259, 266, 267, 343, 351, 354, 137/899; 220/4.26, 4.27, 23.83, 23.86, 220/560.04, 560.11; 280/830–839; 206/0.6; 180/69.4; 222/143
  See application file for complete search history.

(56) References Cited

U.S. PATENT DOCUMENTS

| | | | | | |
|---|---|---|---|---|---|
| 3,783,964 A | * | 1/1974 | Telesio | ...................... | B60K 5/10 180/294 |
| 4,102,461 A | * | 7/1978 | Soyland | ................... | B60K 5/00 212/253 |
| 4,231,444 A | * | 11/1980 | Telesio | ...................... | B60K 5/10 180/294 |
| 4,231,708 A | * | 11/1980 | Telesio | ...................... | B60K 5/10 105/133 |
| 4,394,027 A | * | 7/1983 | Watkins, Jr. | ............ | B60P 3/225 137/351 |
| 4,971,092 A | * | 11/1990 | Parry | ...................... | F16K 35/14 137/351 |
| 5,078,223 A | * | 1/1992 | Ishiwatari | ............ | B62D 21/183 123/41.49 |
| 5,285,863 A | * | 2/1994 | Miki | ..................... | B60K 11/06 180/68.2 |
| 6,668,471 B1 | * | 12/2003 | Cook | ..................... | E02F 9/085 37/410 |
| 6,676,163 B2 | * | 1/2004 | Joitescu | ................. | B60K 15/07 280/834 |
| D743,869 S | * | 11/2015 | Sloan | .......................... | D12/400 |
| 2002/0030397 A1 | * | 3/2002 | Tamura | .................... | B60K 5/04 298/17 R |
| 2004/0075034 A1 | * | 4/2004 | Yokote | .................. | F17C 13/084 248/312 |
| 2005/0029022 A1 | * | 2/2005 | Kubusch | ............. | B60L 11/1881 429/513 |
| 2005/0045391 A1 | * | 3/2005 | Kubusch | ................ | B60K 15/03 429/513 |
| 2008/0105310 A1 | * | 5/2008 | Ogami | .................... | F17C 13/04 137/557 |
| 2008/0115998 A1 | * | 5/2008 | Naganuma | ......... | B60H 1/00371 180/314 |
| 2008/0173358 A1 | * | 7/2008 | Guldi | ................... | G05D 11/133 137/351 |
| 2011/0288738 A1 | * | 11/2011 | Donnelly | ............ | F02D 19/0697 701/99 |
| 2012/0174371 A1 | * | 7/2012 | Koehnen | ................ | B25B 5/003 29/428 |
| 2012/0228307 A1 | * | 9/2012 | Simmons | ............... | B60K 15/07 220/562 |
| 2012/0280481 A1 | * | 11/2012 | Gentry | ................... | B60J 7/1607 280/834 |
| 2013/0112313 A1 | * | 5/2013 | Donnelly | ................ | B67D 7/04 141/4 |
| 2013/0199863 A1 | * | 8/2013 | Robbins | ............... | B60K 15/063 180/69.4 |
| 2014/0034409 A1 | * | 2/2014 | Nakamura | ........... | B62D 21/186 180/291 |
| 2014/0061266 A1 | * | 3/2014 | Milton | ...................... | F17C 5/06 224/404 |
| 2014/0069972 A1 | * | 3/2014 | Willemsen | ............. | B60K 15/07 224/401 |
| 2014/0137953 A1 | * | 5/2014 | Gibb | ........................ | F17C 1/00 137/351 |
| 2014/0217107 A1 | * | 8/2014 | Sloan | ........................ | F17C 1/00 220/581 |
| 2014/0238529 A1 | * | 8/2014 | Komuniecki | .......... | B60K 15/07 141/1 |
| 2014/0291047 A1 | * | 10/2014 | Matsumoto | .......... | B60K 15/077 180/69.4 |
| 2015/0107693 A1 | * | 4/2015 | Green | .................... | B60K 15/07 137/351 |
| 2015/0108747 A1 | * | 4/2015 | Goedken | ................ | B60K 15/07 280/834 |
| 2015/0112506 A1 | * | 4/2015 | Hanlin | ................. | F02M 21/029 701/1 |

* cited by examiner

_US 9,884,552 B2_

VEHICLE FLUID HANDLING SYSTEMS

INCORPORATION BY REFERENCE TO ANY PRIORITY APPLICATIONS

This application claims priority to U.S. Provisional Application No. 62/317,280, filed on Apr. 1, 2016. The entire contents of the application identified above are incorporated by reference herein and made part of this specification.

BACKGROUND OF THE INVENTION

Field of the Invention

This application is directed to novel fluid storage systems and to components thereof and to vehicles that incorporate such systems.

Description of the Related Art

Heavy duty vehicles form a critical part of transportation systems and economies of countries around the world. These vehicles perform a wide range of functions, from long haul and local delivery goods, to local route trash collection, to transporting passengers over long and short distances. These vehicles have many conventional vehicle systems. For instance, a fuel system provides fuel to a combustion engine that powers a drive train to move the vehicle. A braking system applies braking force in response to movement of a hydraulic fluid to the drive train to stop the vehicle. The braking fluid can be stored in a pressure vessel. An air horn, a hydraulic lift, and a compactor actuator are three other examples of systems that can be actuated by air or fluid stored in a pressure vessel.

FIG. 1 shows a conventional location for mounting a pressure vessel 12 for a braking system to a lower portion 8 of a chassis 4 of a vehicle. The chassis 4 mechanically supports the pressure vessel 12, as well as the wheels and other components of a vehicle. The location shown is below the chassis 4, between the forward wheels of the cab and the rear wheels of the semi-trailer. The pressure vessel 12 can be supported by brackets or straps and supplies a fluid that is used to actuate the brakes to slow down the rotation of the wheels. The location shown is satisfactory if the space between the wheels is sufficient but leaves the pressure vessel 12 exposed to damage by rocks or debris from the wheels or road.

Natural gas fuel systems are gaining popularity for a number of reasons. In heavy duty trucks, natural gas fuel systems can be mounted to a roof-top, behind the cab or along the side of the chassis. Often natural gas fuel systems are added to trucks that are manufactured to operate on conventional fossil fuels. This requires the natural gas fuel system to be positioned in only a limited number of locations, such locations having limited space. This requires the natural gas fuel system to be carefully arranged to enable the fossil fuel to natural gas fuel system conversion.

SUMMARY OF THE INVENTION

While conventional vehicle design is able to accommodate mounting fluid vessel of a plurality of fluid handling systems in different locations on the vehicle it would be advantageous to provide for greater integration of at least some components of more than one fluid handling system. There is a need to provide a fluid handling system that can provide for storage of more than one type of fluid within an enclosed space, e.g., within a cowling of the vehicle. It would be particularly advantageous to provide a natural gas fuel system that integrates at least one auxiliary fluid vessel to provide a fluid handling system supporting multiple fluid systems of a vehicle.

In one embodiment, a vehicle fluid storage system is provided that includes a frame assembly and a fuel pressure vessel. The frame assembly has a lower portion and an upper portion. The lower portion has a plurality of brackets that are configured to couple the frame assembly with a chassis of a vehicle. The upper portion has first and second upright frames. The first and second upright frames are disposed on opposite lateral sides of the frame assembly. In one embodiment, of the first and second frames each have a fuel pressure vessel support and an auxiliary fluid pressure vessel support. In another embodiment, at least one of the first and second frames has a fuel pressure vessel support and an auxiliary fluid pressure vessel support. In another embodiment, only one of the first and second frames has a fuel pressure vessel support and an auxiliary fluid pressure vessel support. Other variations are possible. The auxiliary fluid pressure vessel support is spaced apart from the fuel pressure vessel support. The fuel pressure vessel is coupled with the fuel pressure vessel support of the first upright frame and with the fuel pressure vessel support of the second upright frame. The fuel pressure vessel is configured to be filled with a combustible gas fuel. The vehicle fluid storage system also includes an auxiliary fluid pressure vessel. The auxiliary fluid pressure vessel is coupled with the auxiliary fluid pressure vessel support of the first upright frame and with the auxiliary fluid pressure vessel support of the second upright frame. The auxiliary fluid pressure vessel is configured to be filled with an auxiliary fluid. The vehicle fluid storage system also includes an auxiliary fluid manifold that has a first end fluidly coupled with an internal volume of the auxiliary fluid pressure vessel and a second end fluidly coupled with an auxiliary fluid port to be coupled with a pneumatic or hydraulic system of a vehicle.

In another embodiment, a vehicle fluid storage system is provided that includes a cowling, a frame assembly disposed within the cowling, a fuel pressure vessel and an auxiliary pressure vessel coupled with the frame assembly. The cowling is sized to fit between a cab of a tractor unit and a semi-trailer of a heavy duty truck. The frame assembly is configured to couple with a chassis of a vehicle. The fuel pressure vessel is coupled with the frame assembly. The fuel pressure vessel can be disposed within the cowling. The auxiliary fluid pressure vessel is coupled with the frame assembly and disposed within the cowling. The vehicle fluid storage system is configured to supply pressurized fuel from within the cowling to a combustion chamber of an engine. The vehicle fluid storage system is configured to supply an auxiliary fluid from within the cowling to an auxiliary component of a vehicle.

In another embodiment a vehicle fluid storage system is provided. The vehicle fluid storage system includes a frame assembly configured to couple with a chassis of a vehicle, a fuel pressure vessel, and a cowling. The fuel pressure vessel is coupled with the frame assembly. The cowling is disposed around the frame assembly and the fuel pressure vessel. The vehicle fluid storage system also includes an auxiliary fluid pressure vessel coupled with the frame assembly. The auxiliary fluid pressure vessel is disposed within the cowling. The vehicle fluid storage system is configured to supply fuel from within the cowling to a combustion chamber of an engine. The vehicle fluid storage system is configured to supply auxiliary fluid from within the cowling to an auxiliary component of a vehicle.

In one embodiment of the foregoing paragraph, the fuel pressure vessel is configured for storing and supplying compressed natural gas (CNG) fuel. In one embodiment of the foregoing paragraph, the fuel pressure vessel is configured for storing and supplying hydrogen gas. In one embodiment of the foregoing paragraph, the fuel pressure vessel is configured for storing and supplying propane gas.

In another embodiment, a vehicle is provided that includes a chassis, a shell, and a compactor. The shell has a volume to receive a load therein. The compactor is configured to compress a load inside the shell. The vehicle also includes a hydraulic actuator. The hydraulic actuator is coupled with the compactor to cause the compactor to compress the load inside the shell. The vehicle can include a vehicle fluid storage system as disclosed herein. For example, a frame assembly can be coupled with the chassis. An auxiliary fluid pressure vessel coupled with the frame assembly can be in fluid communication with the hydraulic actuator.

In a variation, the vehicle comprises a door. The hydraulic actuator is coupled with the door and with the auxiliary fluid pressure vessel. The auxiliary fluid pressure vessel can be disposed in a cowling.

In another embodiment, a fluid system for a vehicle is provided. The fluid system is configured to couple to a chassis. The fluid system can include a vehicle fluid storage system as disclosed herein. For example, a frame assembly of the fluid system can be configured to couple with the chassis directly or with another component that is coupled, directly or indirectly, with the chassis. A cowling of the fluid system can enclose a fuel pressure vessel and an auxiliary fluid vessel. The auxiliary fluid vessel is configured to be placed in fluid communication with the component powered or operated by the fluid therein.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION OF THE PREFERRED EMBODIMENT

Figure 14:
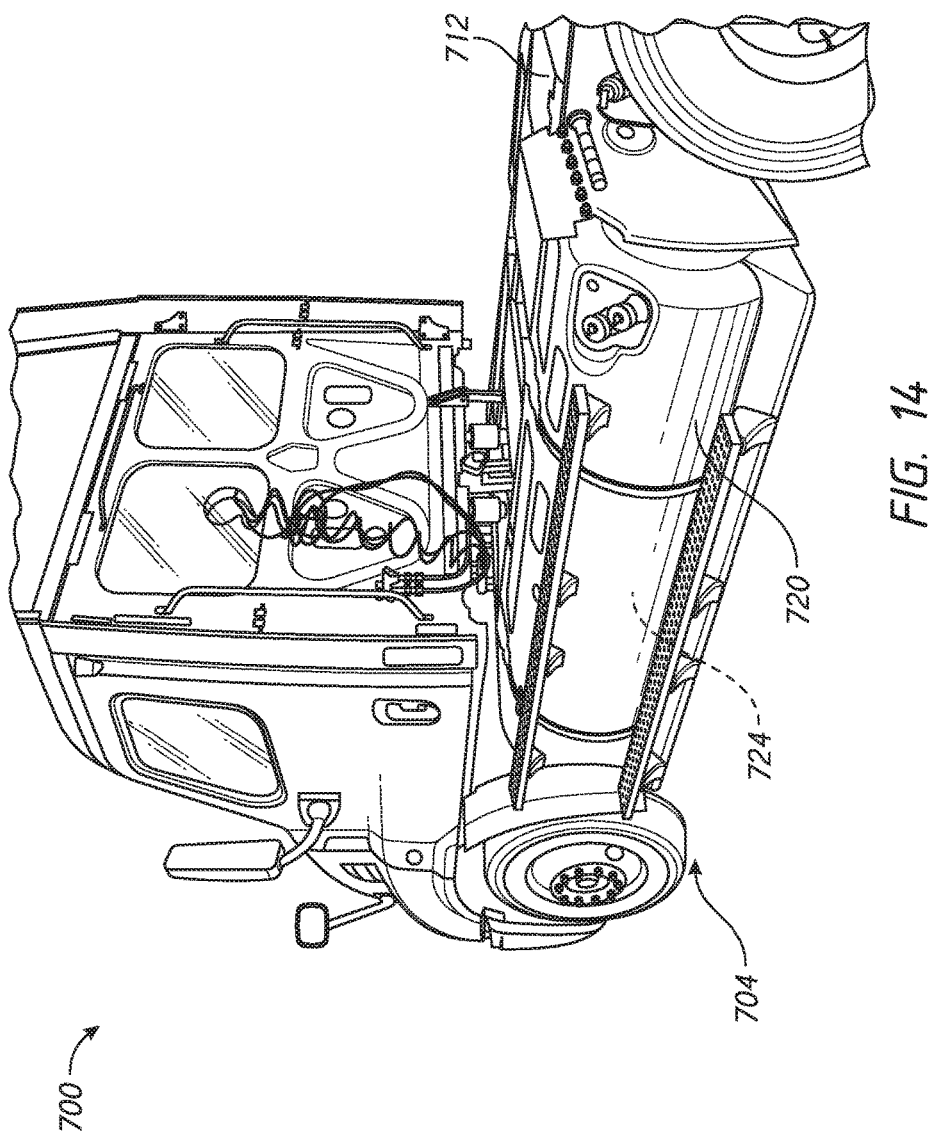
FIG. 14 shows a vehicle with a side-mounted fluid storage system.

This application relates to advanced fluid storage and/or handling systems. Such systems can incorporate a plurality of fluid vessels, at least one of which is able to be subject to high pressure, to be provided working fluids to vehicle systems. The systems can combine a fuel pressure vessel for fuel storage and delivery of fuel to a vehicle engine with auxiliary fluid storage and delivery to auxiliary systems of the vehicle. The auxiliary fluid can be gas state fluid, such as air, useful in a pneumatic system, such as a brake system, an air horn, or other air powered system. The auxiliary fluid can be a liquid state fluid for use in operating a heavy duty door, a lift system, a compactor or another type of hydraulic system. The fluid system can be deployed in any location of a vehicle, such as behind the cab (see, e.g., FIG. 2), mounted to the roof-top (see, e.g., FIG. 10), mounted to the tail-gate (see, e.g., FIG. 12); and/or mounted to a side of a vehicle (see, e.g., FIG. 14)

Behind-the-Cab Systems

Figure 1:
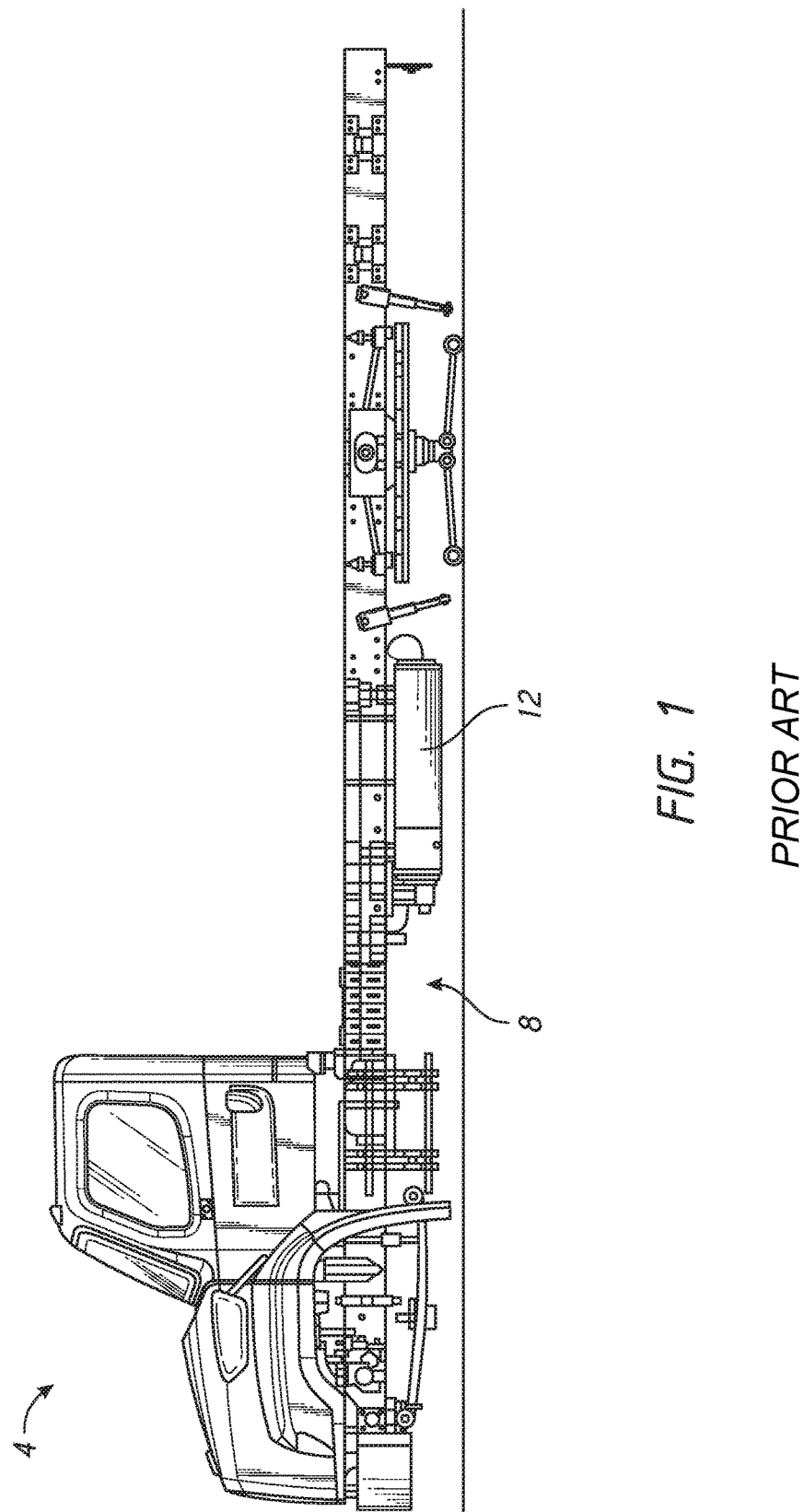
FIG. 1 shows a portion of a heavy duty truck illustrating a conventional location for a compressed air vessel.
Figure 2:
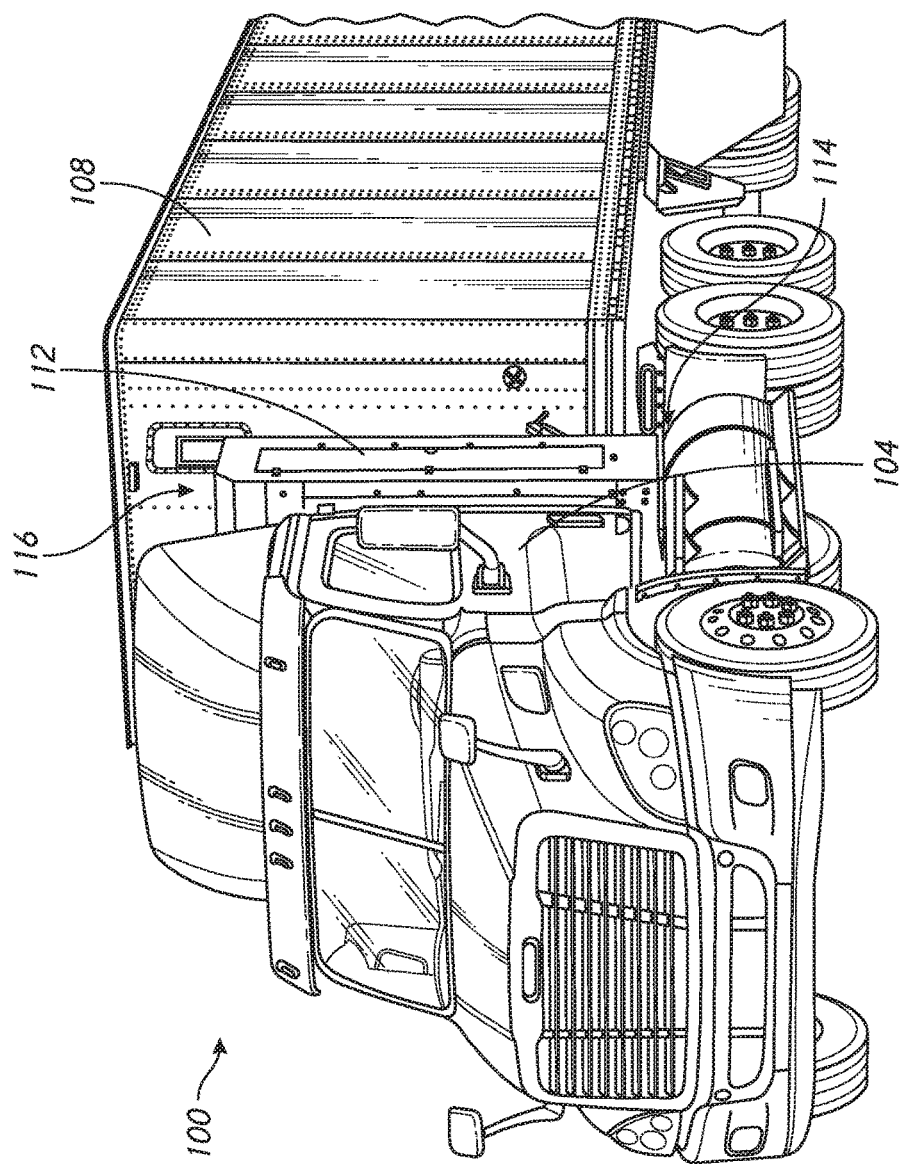
FIG. 2 is a perspective view of a heavy duty truck with a fluid storage system according to one embodiment of this application disposed behind the cab thereof.

FIG. 2 shows a vehicle 100 that can benefit from a fluid system 116 as claimed herein. The vehicle 100 is a heavy duty truck capable of long range hauling, but it could be other heavy duty vehicles as discussed below. The vehicle 100 includes a tractor unit having a cab 104 and a semi-trailer 108. A cowling 112 of the fluid system 116 can be seen disposed between the cab 104 and the semi-trailer 108. The system 116 is mounted to a chassis 114 of the vehicle 100. The cowling 112 encloses a number of components of the fluid system 116 including a fuel pressure vessel 118 and an auxiliary fluid vessel 120 as discussed further below. The auxiliary fluid vessel 120 preferably is able to store a working fluid at elevated pressure. In one application the vessel 120 has a capacity of 1740 cubic inches. In another embodiment, the vessel has a capacity of about 2030 cubic inches. By integrating the auxiliary fluid vessel 120 and the fuel pressure vessel 118 into the fluid handling system 116 the overall system integration of the vehicle 100 can be greatly improved as explained further below. These advantages also apply to fuel systems that are mounted in different locations on a vehicle as discussed below.

Figure 3:
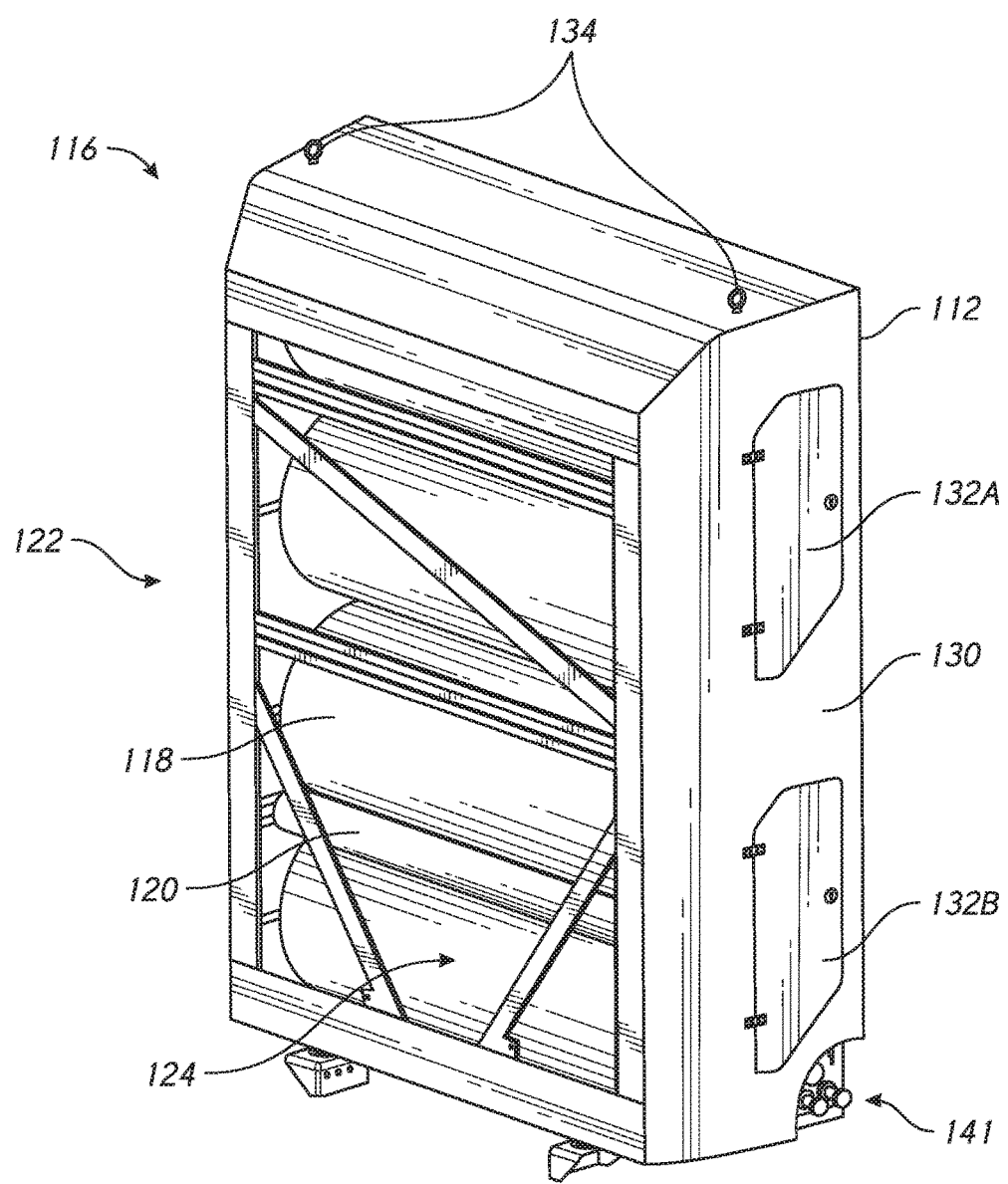
FIG. 3 is a front perspective view of a fluid storage system that can be mounted in a space behind a cab of a heavy duty truck as depicted in FIG. 2.
Figure 4:
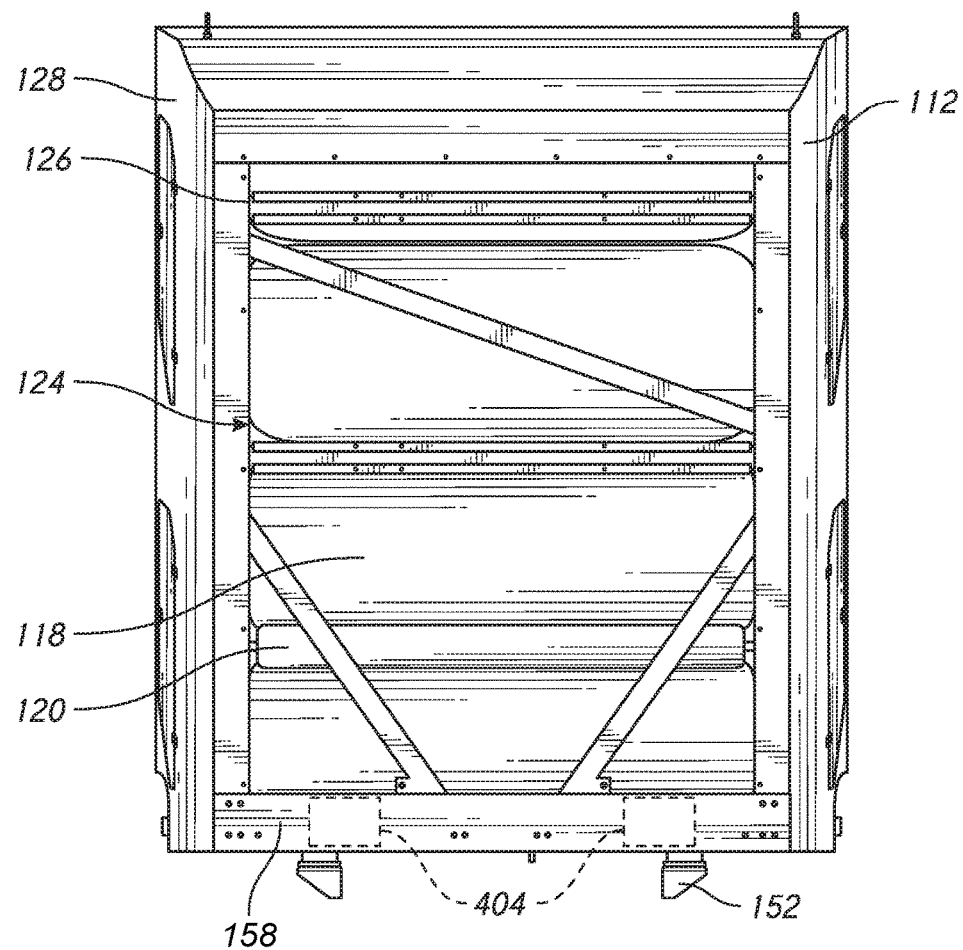
FIG. 4 is a front plan view of the fluid storage system of FIG. 3.

FIGS. 3 and 4 show certain components of the fluid system 116 in more detail. A front portion 122 includes one or more openings 124 through which internal components of the fluid system 116 are exposed. The opening 124 can be bounded by an inner periphery 126 of the cowling on the front portion 122. The opening 124 can be segmented between portions of a frame assembly of the fluid system 116. In the illustrated embodiment, the fluid vessel 120 is accessible through the opening 124 so that the vessel can be inspected, serviced, and/or replaced as needed. In a behind the cab configuration the cab 104 covers the opening 124 to limit access to the components through the opening 124 when the fluid system 116 is mounted to the vehicle 100. This improves upon existing practice by placing the auxiliary fluid vessel 120 in an enclosed space. By leaving access through the opening 124 that is blocked by the cab 104, the fluid system 116 provides a good combination of ease of access with protection of the vessel 120. The opening 124 also enables the fluid handling system 116 to be lighter than if the cowling 112 fully surrounded the fluid system 116 on all side. In some applications, the opening 124 is eliminated and the cowling 112 fully surrounds the internal components of the fluid system 116.

The cab 104 controls flow of air around a front portion of the vehicle 100 preventing the openings 124 from increasing drag significantly. The cowling 112 includes a forward portion 128 that extends from the inner periphery 126 to an outer periphery 130 of the fluid storage system 116. The forward portion 128 may extend laterally of the cab 104 to some extent in some applications. The forward portion 128 may be shaped to reduce a drag contribution by the fluid handling systems 116 in such configurations. For example, the forward portion 128 can be inclined in a rearward direction as shown in FIG. 3 at the top or lateral edges. The system 116 improves on existing practice by disposing the auxiliary fluid vessel out of the air stream to provide aerodynamic benefits resulting in continuous fuel savings.

The cowling 112 can have access panels for enabling user and maintenance access to the enclosed space therein. For example, one lateral side of the outer periphery 130 can have a plurality of access panels, e.g., an upper panel 132A and a lower panel 13B. One of the panels, e.g., the upper panel 132A, can be primarily for accessing the fuel pressure vessel 118. One of the panels, e.g., the lower panel 132b, can provide access to an end of the auxiliary fluid vessel 120. The access panels 132A, 132B also can provide access to controllers, fluid ports, and other features of the fluid system 116, as discussed further in connection with FIG. 5. The access panels 132A, 132B also can provide access to controllers, fluid ports, and other features of an auxiliary fluid system, as discussed further below. Access to the auxiliary fluid vessel 120 and a fluid system coupled therewith through the panel 132B allows service of and/or a change in configuration of auxiliary systems that are powered by the fluid in the auxiliary fluid vessel 120.

The fluid system 116 can also have one or a plurality of handling members 134 accessible on an outside surface of the cowling 112. The handling members 134 can include one or a plurality of hooks or eye-bolts. The handling members 134 preferably are on a top side of the system 100, such that the system 100 can be suspended by cables or other tension members and lowered thereby into position. Other handling members 134 can be provided. The handling members 134 enable the fluid system 116 to be hoisted onto the vehicle 100 or removed therefrom for repair, reconditioning or replacement. For example, as discussed above, the auxiliary fluid vessels 120 are accessible through the opening 124. By lifting the system 116 using the handling members 134, the vessel 120 can be inspected, serviced and repaired. The handling members 134 are advantageous for applications where the fluid system 116 is retrofitted to the vehicle 100. The handling members 134 can be used in original assembly of the vehicle 100 as well.

FIGS. 3-6 shows different aspects of a frame assembly 140 of the fluid storage system 116. The frame assembly 140 is at least partially disposed within the cowling 112. In the illustrated embodiment, the frame assembly 140 is entirely enclosed within the cowling 112 other than an exposed portion 141 coupled with an exposed connection panel. The frame assembly 140 has a lower portion 144 and an upper portion 148. The fuel storage system 116 is configured to be mounted to or to couple with a chassis 114 of the vehicle 100. The fuel storage system 116 can be couple with the chassis 114 at or below the lower portion 144. For example, the lower portion 144 can have one or a plurality of brackets 152 that are configured to couple the frame assembly 140 with the chassis 114 of the vehicle 100. The fluid system 116 can be lowered by a hoist coupled with the handling members 134 on the chassis 114 until one face of each of the brackets 152 is aligned with a mounting portion of the chassis. Thereafter, the brackets 152 can be secured to the chassis 114.

Figure 5:
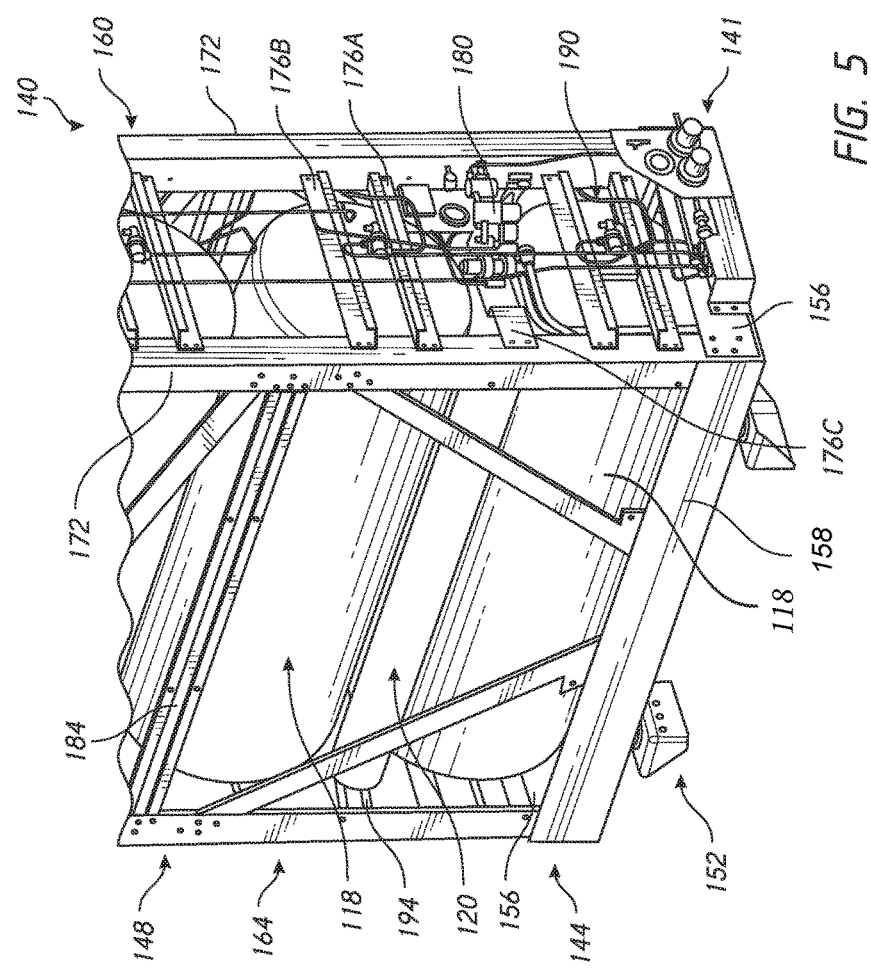
FIG. 5 is a detail front perspective view of the fluid storage system of FIG. 3 with the cowling thereof removed for enhanced clarity of view of the internal components of the system.
Figure 6:
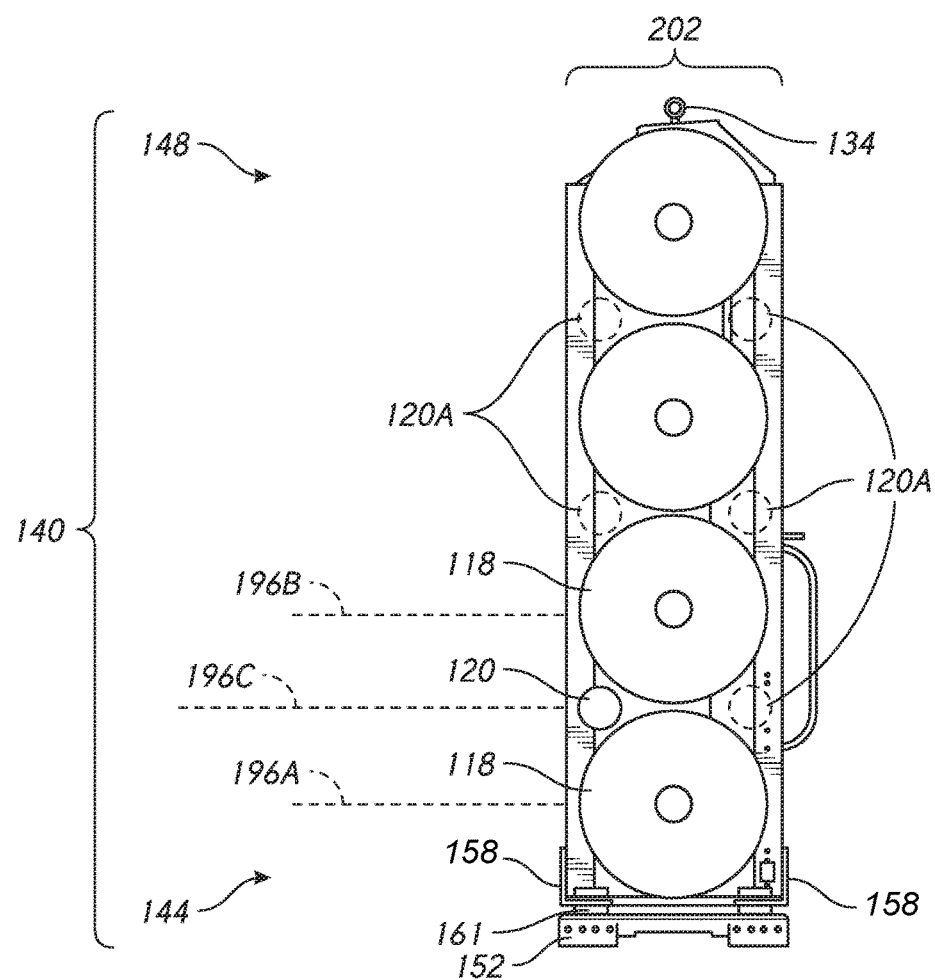
FIG. 6 is side view of the fluid storage system of FIG. 3 with the cowling thereof removed showing a number of auxiliary fluid pressure vessel support locations.

FIG. 5 shows an embodiment in which the lower portion 144 includes first and second lateral members 156 and first and second traverse members 158. One of the lateral members 156 is disposed on aside of the frame assembly 140 corresponding to the driver side of the vehicle 100, e.g., in a position below components accessible through the panels 132A, 132B. Another lateral member 156 is disposed on the opposite lateral side of the frame assembly 140. FIG. 6 shows the transverse members 158. The lateral ends of the transverse members 158 are coupled with the first and second lateral members 156. In the illustrated embodiment the lateral members 156 comprise a plate-like structure and the transverse members 158 comprise L-brackets. A damper 161 (see FIG. 6) can be disposed between the transverse members 158 and the brackets 152 to isolate the fluid system 116 from vibration and shock from the road, at least to some extent. The brackets 152 can be assembled to the transverse members 158 and thus can be part of the lower portion 144 of the frame assembly 140 in some embodiments. In other embodiments, the brackets 152 can be part of a standard chassis component to which the lower portion 144 of the frame assembly 140 is to be coupled.

The upper portion 148 of the frame assembly 140 can have any suitable configuration. For example, the upper portion 148 can have first and second upright frames 160, 164. The first and second upright frames 160, 164 are disposed on opposite lateral sides of the frame assembly 140. The lateral member 156 disposed beneath the components accessible through the panels 132A, 132B can be coupled with or can be a lower portion of the first upright frame 160. The lateral member 156 disposed opposite these components can be coupled with or can be a lower portion of the second upright frame 164. The first and second upright frames 160, 164 are located such that when the fluid system 116 is mounted to the chassis 114 the first upright frame 160 is on the driver side of the vehicle and the second upright frame 164 is on the passenger side of the vehicle. The opposite placement is also possible. In one embodiment, one of the frame members 160, 164 supports components of a fluid system including the auxiliary fluid vessel 120 in a manner allowing access thereto through the panels 132A, 132B or at the exposed portion 141.

The upright frames 160, 164 preferably include mounting features for creating a space to position the auxiliary fluid vessel 120 and for supporting various components. For example, the upright frames 160, 164 can include a plurality of elongate members 172 that have lower ends coupled with the lower portion 144 of the frame assembly 140 and upper ends disposed way from the lower ends. The elongate members 172 can be L-brackets in one embodiment. The elongate members 172 can partially define the perimeter of a space for disposing and, in some embodiments, enclosing the auxiliary fluid vessel 120. A plurality of lateral members 176 can be coupled to elongate members 172. The lateral members 176 can have forward ends coupled with a forward elongate member 172 and rearward ends coupled with a rearward elongate member 172.

In one configuration the lateral members 176 provide one or both of structural reinforcement and component supporting functions to the upright frames 160, 164 and to the frame assembly 140. FIG. 5 shows another configuration in which at least some of the lateral members 176 provide multiple functions. A first lateral member 176A comprises a C-shaped configuration in which a first side is coupled with lateral surfaces of the forward and rearward elongate members 172. The C-shaped lateral member 176A provides a second side adjacent to the first side. The second side can have a horizontal surface extending laterally from the first side. The horizontal surface can support the fuel pressure vessel 120 as discussed further below. The C-shaped lateral member 176A provides a third side adjacent to the second side. The third side can be configured to couple with a portion of a fluid manifold as discussed further below. A second lateral member 176B can be provided in some embodiments. The second lateral member 176B can have a configuration similar to that of the first lateral member 176A, e.g., a C-shaped configuration. In one arrangement, the second lateral member 176B is inverted compared to the first lateral member 176A. The second lateral member 176B can have a horizontal surface adjacent to a lower end of a first side of the member 176B. The horizontal surface of the second lateral member 176B can extend laterally of the first side of the second lateral member 176B. The horizontal surface of the second member 176B can be positioned to face a horizontal surface of the first lateral member 176A. The horizontal surfaces of the first and second lateral members 176A, 176B can support pressure vessels directly or indirectly as discussed further below. Although shown supporting the fuel pressure vessel 118 a pair of support members similar in structure to the members 176A, 176B could be provided to support the auxiliary fluid vessel 120.

A third member 176C can be configured for supporting fluid manifold components 180. The fluid manifold components 180 can include regulators, pressure relief devices, or other components of a state of the art fuel system in one embodiment. The fluid manifold components 180 can include conduit, couplers or fluid line junctions for auxiliary fluid systems in another embodiment. The fluid manifold components 180 can include components of both a fuel system and an auxiliary fluid system in another embodiment. In one compact arrangement the third member 176C is configured to enable the fluid manifold components 180 to be recessed into the upright frame 160. A recessed configuration can allow the fluid manifold components 180 be at least partially inward of a plane of the lateral sides of the elongate members 172.

One approach to recessing the components 180 is to form the third member 176C with a bight along the direction from the forward to rearward. The bight can be seen in a top view of the third member 176C. The bight has a first portion that extends away from the lateral side of the upright frame 160 toward a transverse center of the fluid system 116, a second portion that extends along the forward-to-rearward direction, and a third portion that extends from the second portion toward the lateral side of the upright frame 160. The first portion and the third portion are coupled with the forward and rearward elongate members 172 respectively. The extent of the first and third portions controls the depth of recessing of the second portion of the third member 176C. The recessing can be at least 25% of the dimension of the fluid manifold components 180 as measured in the transverse direction. The recessing can be at least 50% of the dimension of the fluid manifold components 180 as measured in the transverse direction. The recessing can be at least 100% or more of the dimension of the fluid manifold components 180 as measured in the transverse direction. The fluid manifold components 180 can be nested into the area at least partially surrounded by the bight of the third member 176C. The nesting of the fluid manifold components 180 provides some protection for these components and also reduces the width of the system 116 overall. Reduced width can contributed to weight reduction and to aerodynamic drag contribution by the system 116 to the vehicle 100.

In the illustrated embodiment, the lateral members 176A, 176B, and 176C are all mounted to outside surfaces of the elongate members 172. In other embodiment, the lateral members 176A, 176B, and 176C can be coupled with inside surfaces of the elongate members 172, e.g., the side facing the space surrounded by the frame assembly 140.

Figure 8:
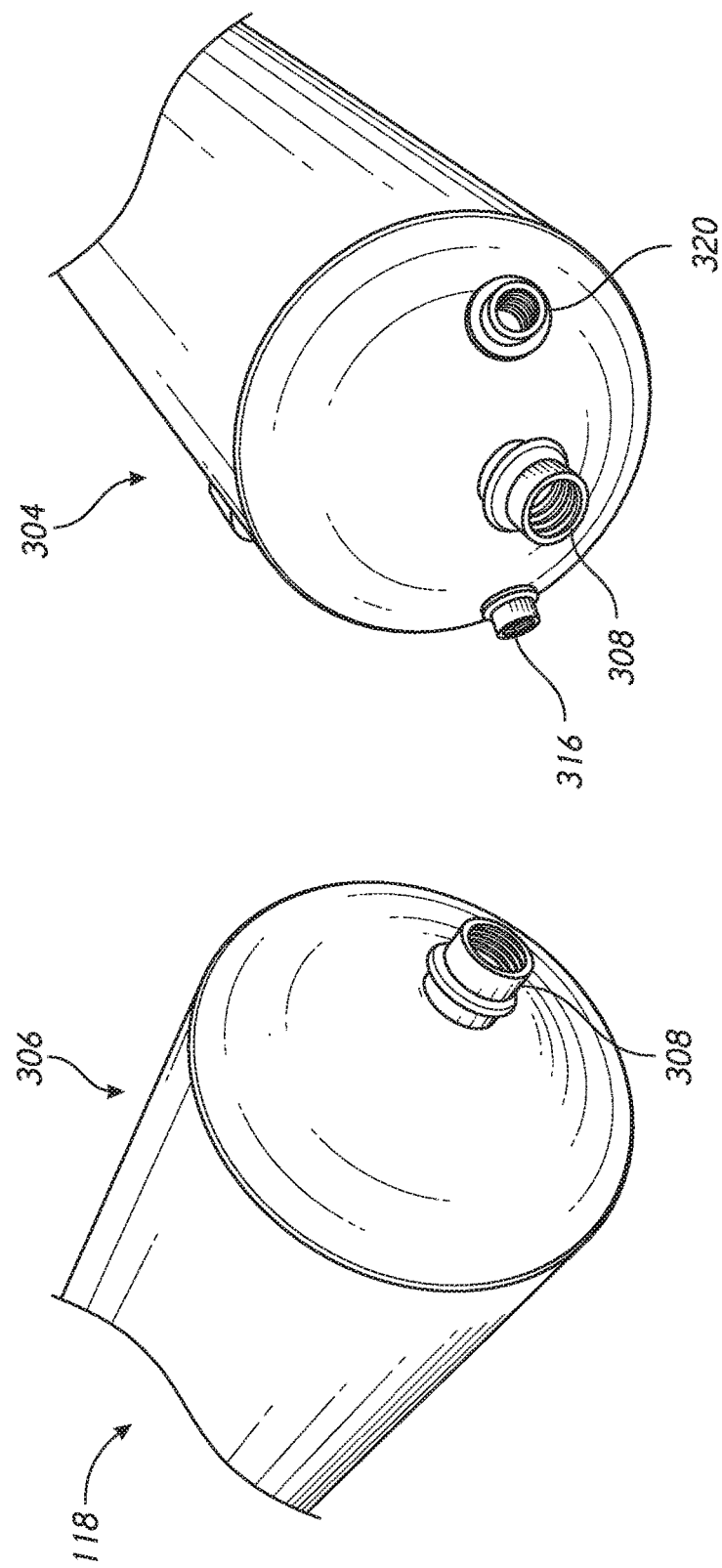
FIG. 8 is a perspective view of end portions of two tanks, illustrating ports of pressure vessels of the fluid storage system of FIG. 3.

FIG. 5 shows that in one embodiment, of the first and second upright frames 160, 164 each have a fuel pressure vessel support 190 and an auxiliary fluid pressure vessel support 194. The fuel pressure vessel support 190 is configured to receive and retain an end portion 304 (See FIG. 8) of the fuel pressure vessel 118. For example, in one embodiment a mounting block assembly is provided in which a first block portion is configured to support a boss 308 of the end portion 304 from beneath. The first block can have a semi-cylindrical surface upon which a lower portion of the boss 308 rests in a free state. The block assembly can have a second block that is placed over the boss 308 to cover the boss. For example, the second block can have a semi-cylindrical surface that can be disposed over a top surface of the boss 308. The first and second blocks of the block assembly can form a cylindrical surface that surrounds the boss 308. The first block can be secured to the first lateral members 176A. The second block can be secured to the second lateral member 176B directly above the first lateral member 176A to which the first block is secured. The block assembly enables the lateral members 176A, 176B to indirectly support the boss 308 and thereby the fuel pressure vessel 118.

In one embodiment, a block assembly is used to support the end portion 304 and a block assembly is used to support the end portion 306, which is an end portion of the fuel pressure vessel 118 opposite the end portion 304. The end portion 304 will usually be supported in the fluid system 116 adjacent to the location of the access panels 132A, 132B of the cowling 112. This allows a user to access fill and bleed ports 316, 320 of the fuel pressure vessel 118 as needed. The ports 316, 320 can be directly accessed or can be in fluid communication with a fluid line that is remote from the ports 316, 320. This would permit the pressure vessel 118 to be mounted in the opposite orientation such that the ports 316, 320 are not close to or accessible through the panel 132A, 132B.

The auxiliary fluid vessel 120 can be supported in the same manner as the fuel pressure vessel 118, for example, by a block assembly configured to form a cylindrical surface that surrounds a boss or other end portion of the vessel 120. The block assembly can be mounted on the same or a similar structure to the members 176A, 176B. As discussed below, in certain embodiments to improve the integration of the auxiliary fluid vessel 120 in the confined space of the cowling 112 the vessel 120 can be mounted in a different manner than the fuel pressure vessels 120.

Figure 11:
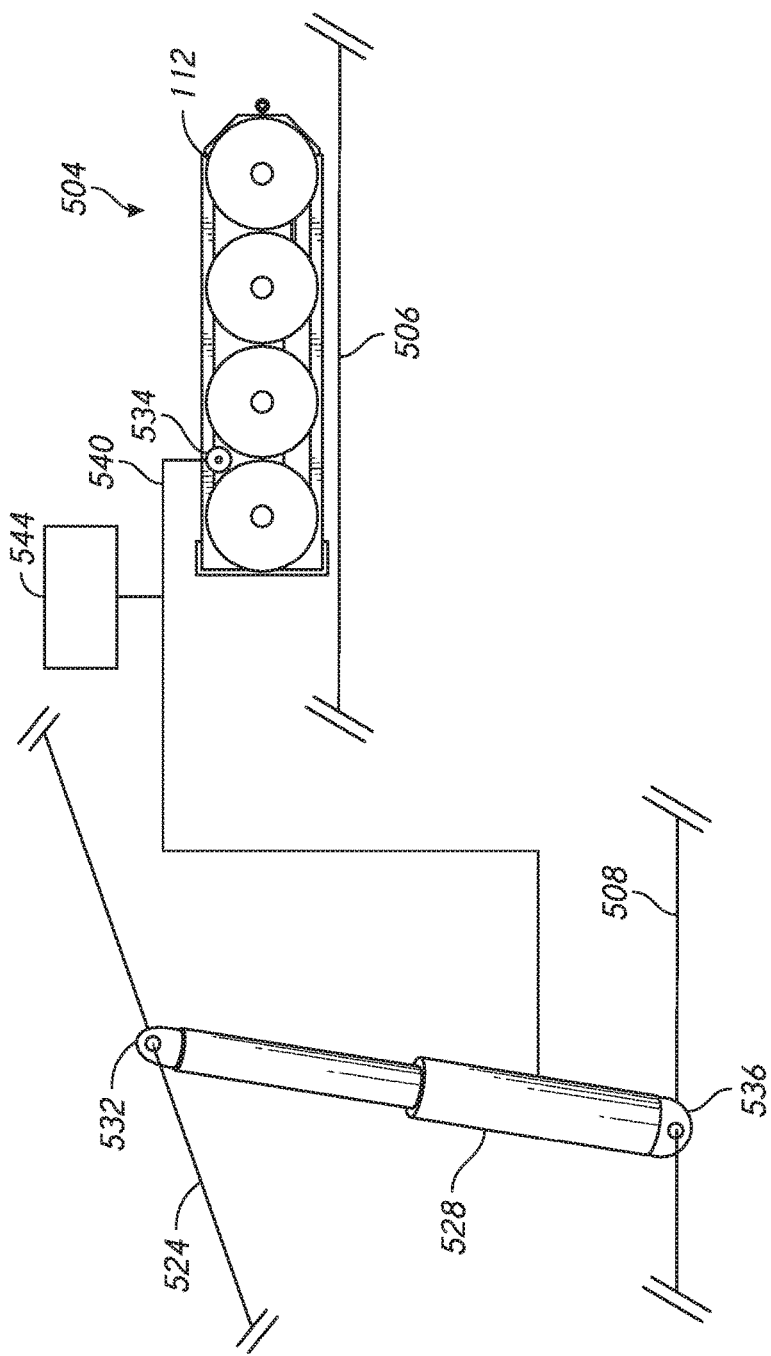
FIG. 11 illustrates another auxiliary component that can be coupled with the auxiliary fluid pressure vessel of the fluid storage system of the garbage truck of FIG. 10.
Figure 13:
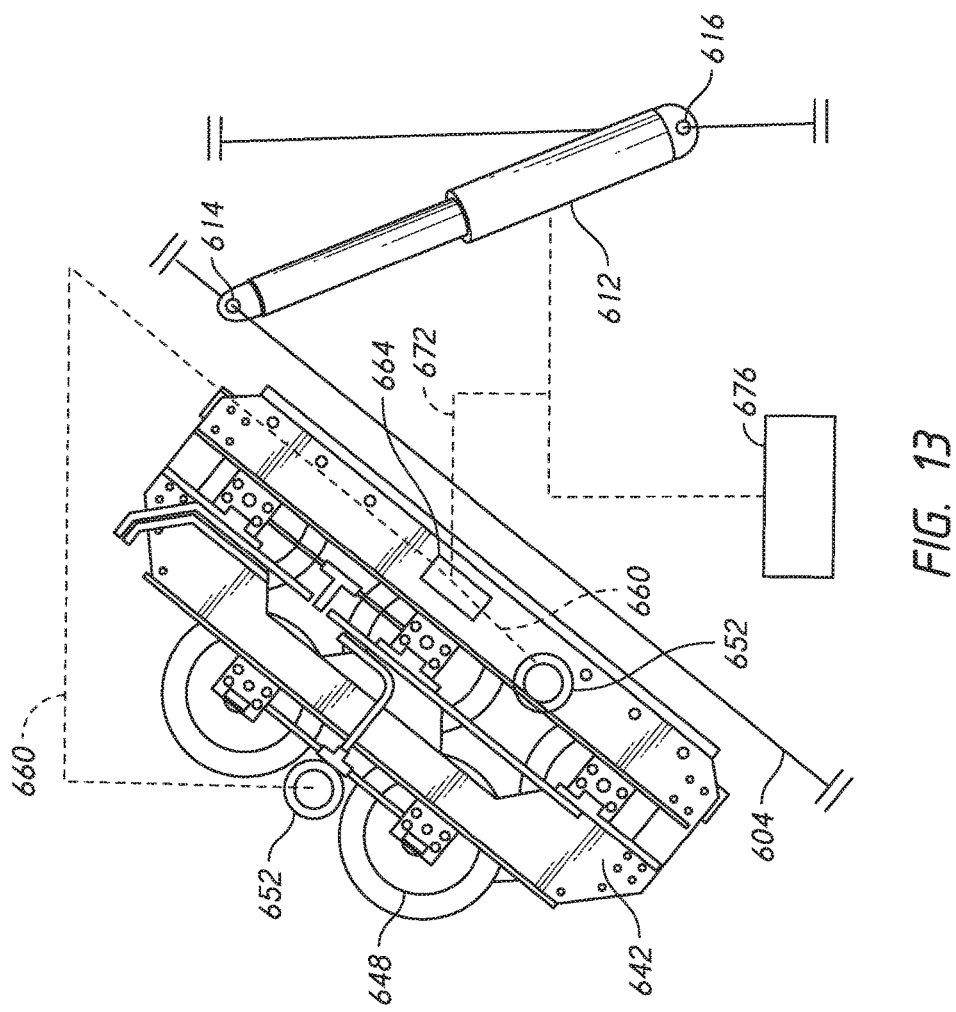
FIG. 13 illustrates a system including a component powered by a fluid vessel disposed in the tail-gate mounted fluid storage system of FIG. 12.

The fluid vessels 118, 120 preferably are mounted to the frame assembly 140 in a compact array. The fluid system 116 can have a plurality of fuel pressure vessel supports 190 on each of the first upright frame 160 and the second upright frame 164 to support a plurality of fuel pressure vessels in a compact array. FIG. 6 shows that the compact array can include a vertically oriented array. The vertically oriented array can include providing a plurality of, e.g., four, fuel vessels 120 aligned in a vertical plane. In one instance the central longitudinal axes of the pressure vessels 120 can be disposed on a common vertical plane. FIG. 11 shows that the central longitudinal axes of the pressure vessels 120 can be disposed on a common horizontal plane. FIG. 13 shows that the central longitudinal axes of the pressure vessels 120 can be disposed on a common plane that is not vertical or horizontal but generally along a surface of the vehicle that is angled to one or both of these planes. A line connecting the central longitudinal axes of the pressure vessels 120 can be arcuate, e.g., following a contour of a tailgate or other curved surface of a vehicle. In such embodiments, a central longitudinal axis of the fluid vessels 118 may be spaced away from a line connecting the central longitudinal axes of two adjacent fuel vessels 120.

FIG. 6 shows that in one embodiment a fuel pressure vessel 118 at a first, e.g., a lowest, elevation 196A can be disposed immediately below a second fuel pressure vessel 118 at a second elevation 196B. A compact arrangement of the fluid vessels 118, 120 can be provided by mounting the auxiliary fluid vessel 120 at a third elevation 196C that is above the first elevation 196A and that is below the second elevation 196B. In addition, the fluid vessel 120 can be arranged away from the plane of the central axes of the fluid pressure vessels 118 at the first and second elevations. For example, the central longitudinal axis of the auxiliary fluid vessel 120 can be located away from, e.g., forward of, the central longitudinal axes of one or both of the fluid pressure vessels 118 at the first and second elevations. The central longitudinal axis of the auxiliary fluid vessel 120 can be located rearward of the central longitudinal axes of one or both of the fluid pressure vessels 118 at the first and second elevations.

In one embodiment the auxiliary fluid vessel 120 can be nested in with two fuel pressure vessels 118. Nest means, broadly, that the auxiliary fluid vessel 120 is received in a space between the two fuel pressure vessels 118. For example, FIG. 6 shows that an area can be bounded by outer surfaces of two fuel pressure vessels 118 and a forward portion of the frame assembly 140. The auxiliary fluid vessel 120 can be positioned in this area. The area so bounded can be further bounded by the forward-most portion of the two fuel pressure vessels 118. In one embodiment, a vertical line intersecting an outer periphery of a first fuel pressure vessels 118 at the first elevation 196A and also intersecting an outer circumference of a second fuel pressure vessels 118 at the second elevation 196B also intersects the auxiliary fluid vessel 120. The central longitudinal axis of the auxiliary fluid vessel 120 can be located at this line. The central longitudinal axis of the auxiliary fluid vessel 120 can be located between this line and a vertical plane intersecting the central longitudinal axis of the fuel pressure vessels 118 at the first elevation 196A and the fuel pressure vessels 118 at the second elevation 196B. These arrangements allow the cowling 112 to extend nearly tangentially to the outer periphery of the fuel pressure vessels 118 while at the same time enclosing the auxiliary fluid vessel 120. These arrangements allow the auxiliary fluid vessel 120 be positioned in a fuel system without significant enlargement or modification of the cowling 112.

FIG. 6 shows that further fluid vessels can be provided in certain embodiments. A third fuel pressure vessel 118 can be disposed at a fourth elevation above the second fuel pressure vessel 118. A fourth pressure vessel 118 can be disposed at a fifth elevation above the third fuel pressure vessel 118. One or a plurality of additional fluid vessels 120A can be provided in spaces similar to those discussed above. By providing a number of additional fluid vessels 120A, the volume of fluid available for an auxiliary fluid system can be increased. By providing additional fluid vessels 120A, the size of individual vessels 120, 120A can be reduced while still meeting the volume demands of a system.

The illustrated embodiments provide that both the first frame 160 and the second frame 164 support the fuel pressure vessel 118 at fuel pressure vessel supports 190. In another embodiment, at least one of the first frame 160 and second frame 164 has a fuel pressure vessel support 190 and an auxiliary fluid pressure vessel support 194. In another embodiment, only one of the first frame 160 and the second frame 164 has a fuel pressure vessel support 190 and an auxiliary fluid pressure vessel support 194. Other variations are possible. The auxiliary fluid pressure vessel support 194 is spaced apart from the fuel pressure vessel support, as discussed further below.

The frame assembly 140 can be strengthened by providing a number of braces, e.g., transverse braces 184 and/or disposed between the first and second upright frames 160, 164.

FIGS. 5 and 6 show further details of how the fuel pressure vessel 118 and the auxiliary pressure vessel 120 are integrated in the space defined by the frame assembly 140. FIG. 6 shows that a front-to-back profile 202 can be provided that yields a compact arrangement suitable for a behind the cab configuration. This arrangement provides a compact horizontal arrangement. FIG. 11 shows that in certain application a compact vertical arrangement is preferred. A compact vertical arrangement is preferable for roof-mounted systems.

Figure 7:
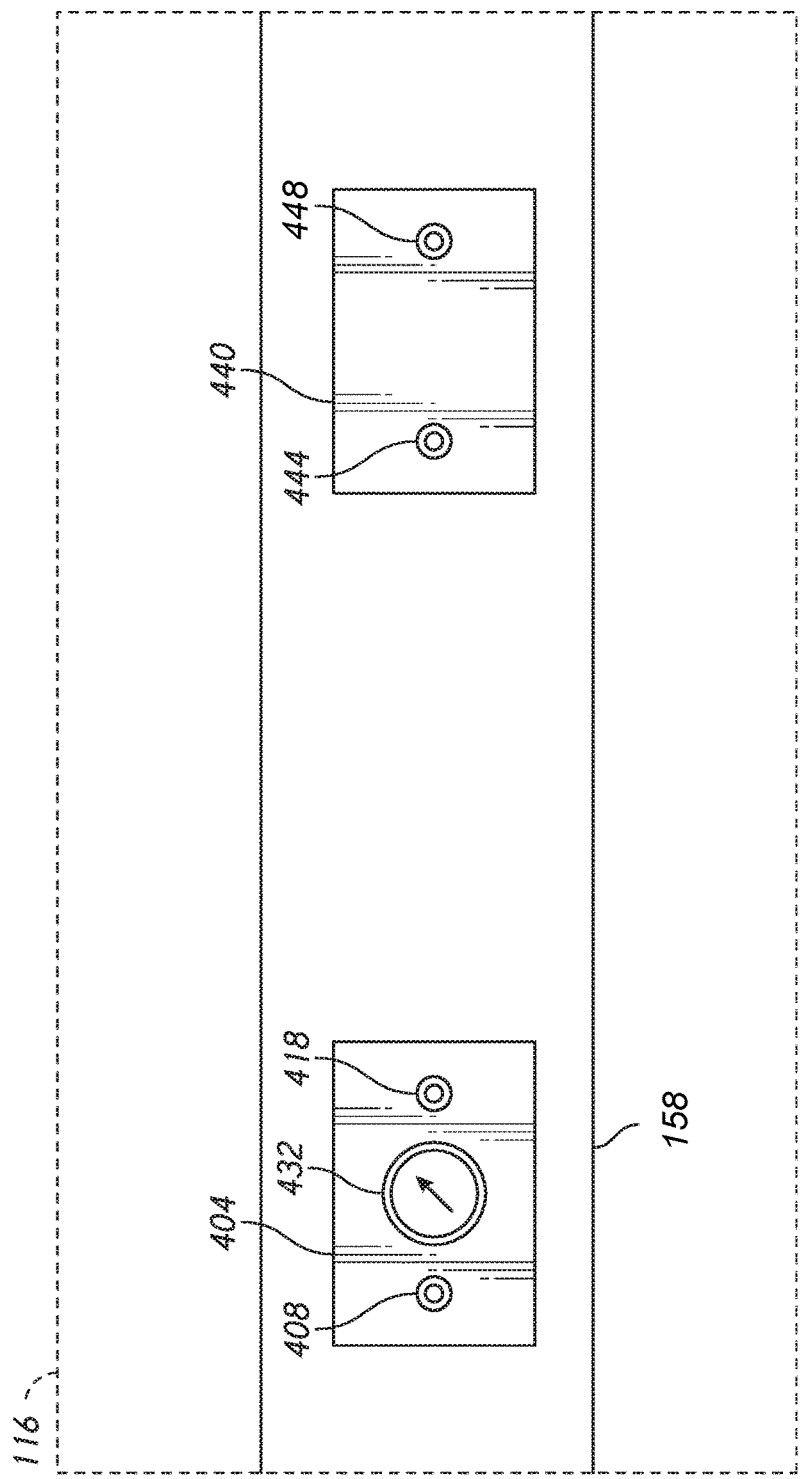
FIG. 7 shows a portion of a manifold that can be coupled with one or more pressure vessels of the fluid storage system of FIG. 3.
Figure 9:
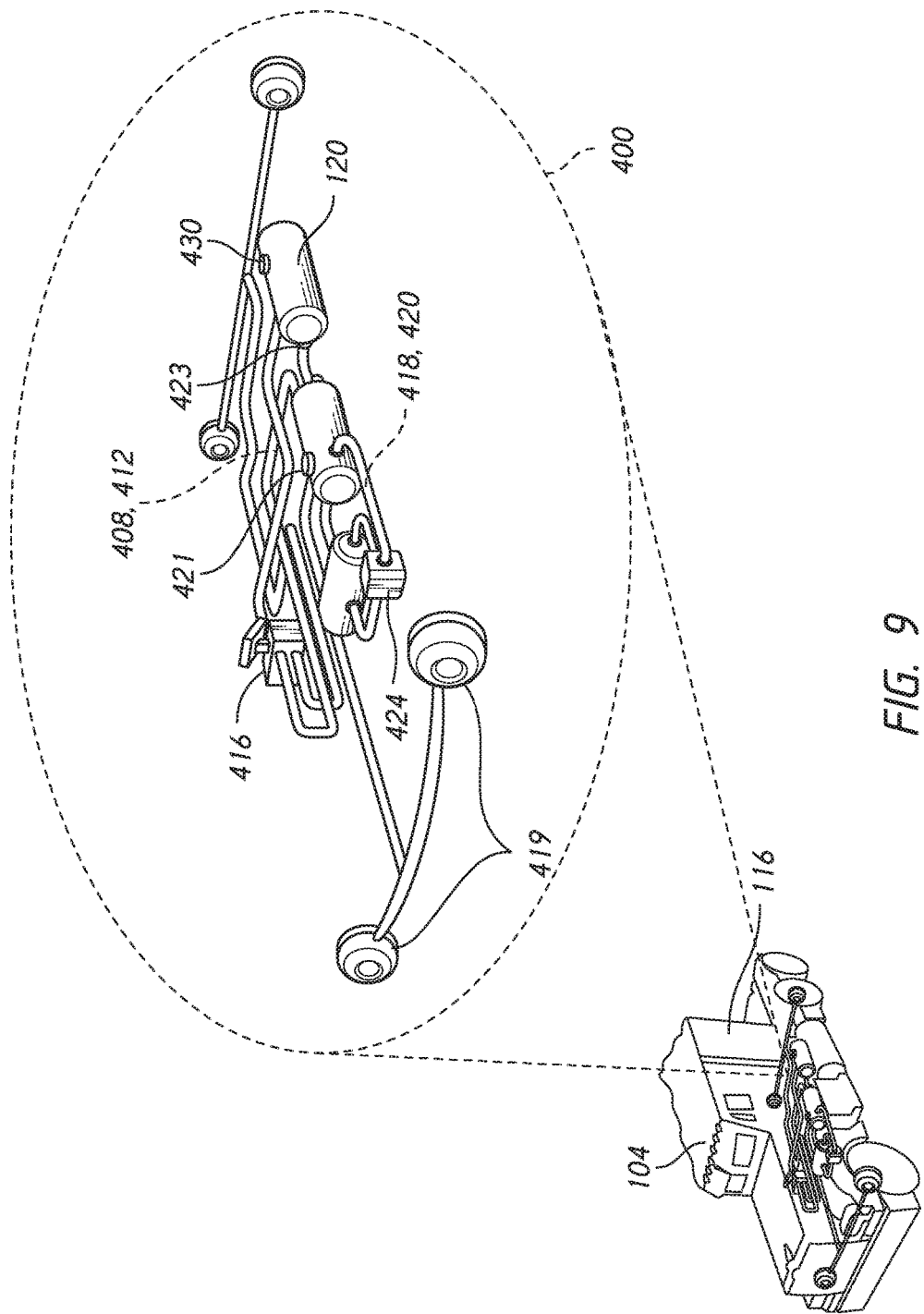
FIG. 9 illustrates one auxiliary component that can be coupled with an auxiliary fluid pressure vessel of the fluid storage system of FIG. 3.

FIGS. 4, 7, and 9 illustrate further aspects of a fluid system 400 that can be at least partially integrated into the space surrounded by the frame assembly 140 and/or the cowling 112. In one embodiment, a forward portion of the fluid system 116 includes an access panel 404 for coupling the auxiliary fluid vessel 120 with other components of the fluid system 400. The panel 404 can be formed at or through one of the transverse members 158. The panel 404 can include one or more connection ports to couple the vessel or vessels 120 with other components of the fluid system 400. The panel 404 can include a first port 408 coupled to a fluid line 412 that extends between a foot valve 416 and the vessel or vessels 120. When the foot valve 416 is depressed the pressure in the fluid line 412 is communicated to brake lines coupled with brake chambers 419. The pressure can be communicated to some or all of the wheels of the vehicle 100. The panel 404 can include a second port 418 that can be coupled with a fluid line 420 that extends from a compressor 424 to the vessel or vessels 120. FIG. 9 illustrates that the fluid system 400 can have two auxiliary fluid vessels 120. Both of these vessels can be disposed within the cowling 112. Components disposed outside the cowling 112 can communicate with the vessels 120 via the panel 404. The fluid system 400 can also include an indicator 430 providing some diagnostic information about the system 400. The indicator 430 is shown schematically associated with one of the pressure vessels 120. The indicator 430 can include a sensor located inside the cowling 112, a read-out 432 on the panel 404, a read-out in the cab 104 or any combination of these components or locations. The panel 404 is shown in more detail in FIG. 7. The system 400 also can have one or more valves. For example, a bleed valve 421 can be provided within the cowling 112. Additionally one or more check valves 423 can be provided inside the cowling 112 to regulate flow.

FIG. 7 also shows that a secondary panel 440 can be provided with a first port 444 and a second port 448. The first port 444 can be coupled with a valve or switch for powering a second fluid system, such as an air horn (not shown). The second port 448 can be coupled with a source of fluid, such as air to supply a line coupled with the first port 444. The second port 448 can be coupled with an air compressor, for example. The first and second panels 404, 440 can be independently coupled with one, two or more than two independent fluid vessels 120 through manifolds. In other embodiments, a common manifold can be provided that channels the flow of fluid to and from the vessels 120.

Roof Mounted Systems

Figure 10:
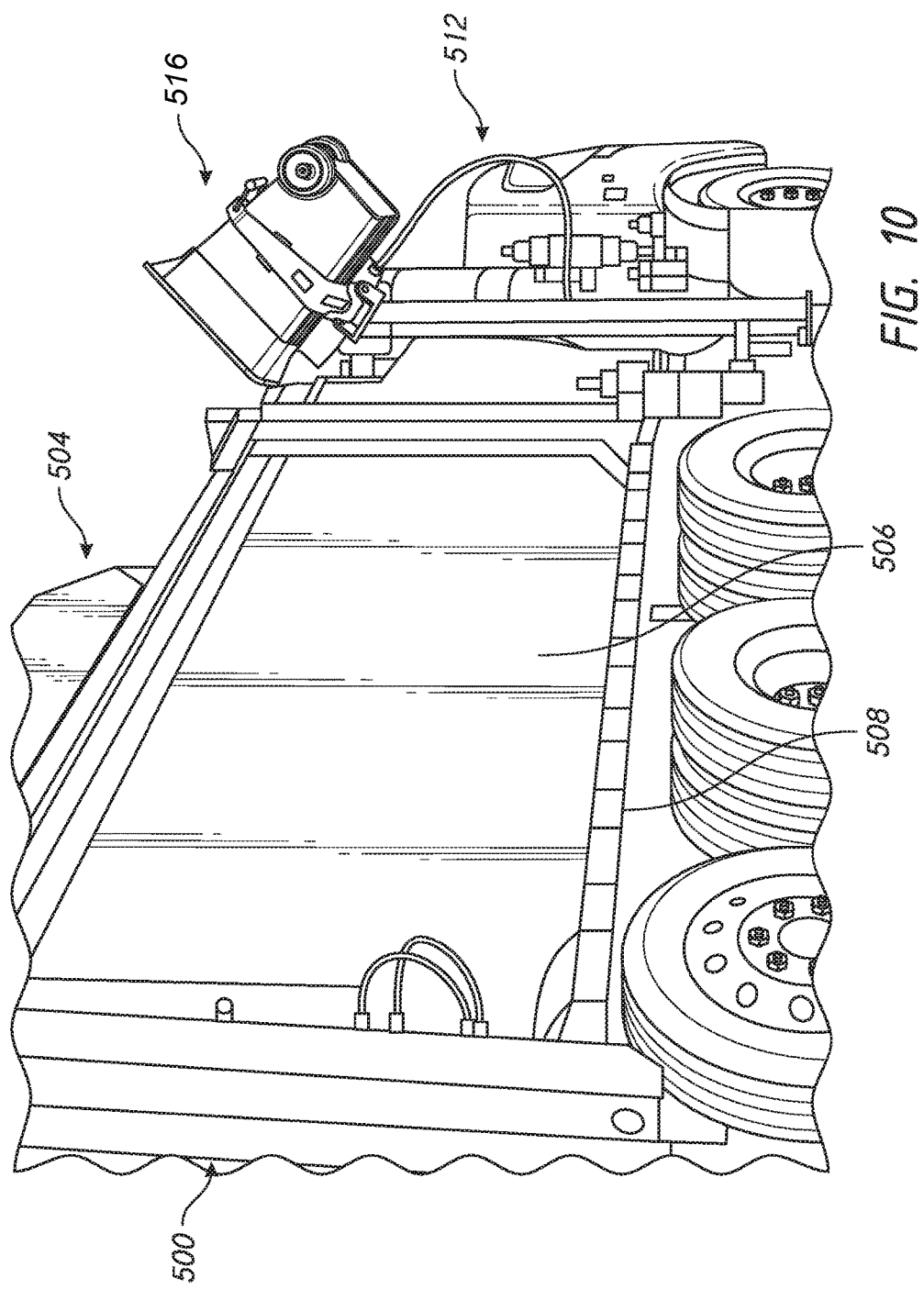
FIG. 10 shows a garbage truck with a roof mounted fluid storage system.

FIGS. 10 and 11 show additional features of various embodiments. FIG. 10 shows a vehicle 500. The vehicle 500 is a refuse truck. The vehicle 500 has a fluid handling system 504 mounted to a top of a shell 506 thereof. The system 504 is similar to the system 116 except as described differently below.

The shell 506 is mounted to a chassis 508 of the vehicle 500. The shell 506 has a volume to receive a load of refuse therein by a lift system 512 that lifts and dumps garbage bins 516 therein. A compactor 524 disposed within the shell 506 serves to compress the refuse that is deposited therein. The compactor 524 is shown schematically, but would generally include a rigid plate that moves toward a rigid portion of the shell 506 or vehicle 500 to reduce the volume of the space inside the shell 506 temporarily to cause the contents thereof to occupy less space.

The vehicle 500 also includes a hydraulic actuator 528. The hydraulic actuator 528 is coupled at a first end 532 with the compactor 524 and directly or indirectly at a second end 536 with the chassis 508 of the vehicle 500. The vehicle 500 includes a compactor actuator system that include an auxiliary fluid vessel 534 disposed in the cowling 112. A fluid line 540 coupled with the vessel 534 at a first end is also coupled with the hydraulic actuator 528 at a second end opposite the first end. A start button 544 causes the flow of hydraulic fluid from the vessel 534 to flow into or to convey pressure into the actuator 528 through the fluid line 540. The flow of fluid or the conveyance of pressure via the fluid line 540 causes the hydraulic actuator 528 to move the compactor 524 to compress the refuse deposited in the shell 506. This allows more material to be loaded into the shell 506 to make the route more efficient. The start button 544 can be located inside the cab of the vehicle 500 or adjacent to the lift system 512.

In one variation, the hydraulic actuator 528 is coupled with a door or tailgate that is configured to provide access to or enclose the inside area of the shell 506. The actuator 528 in this embodiment can be configure to lift a heavy load, which can even include the fluid system 504 or a variant thereof that may be mounted on the door or tailgate.

In one embodiment multiple fluid systems of the vehicle 500 can be driven from fluids stored within the cowling 112. For example, in addition to the compactor 524, the lift system 512 could also be driven by a hydraulic or pneumatic system including one or more of the fluid vessels 534.

Tailgate Mounted Systems

Figure 12:
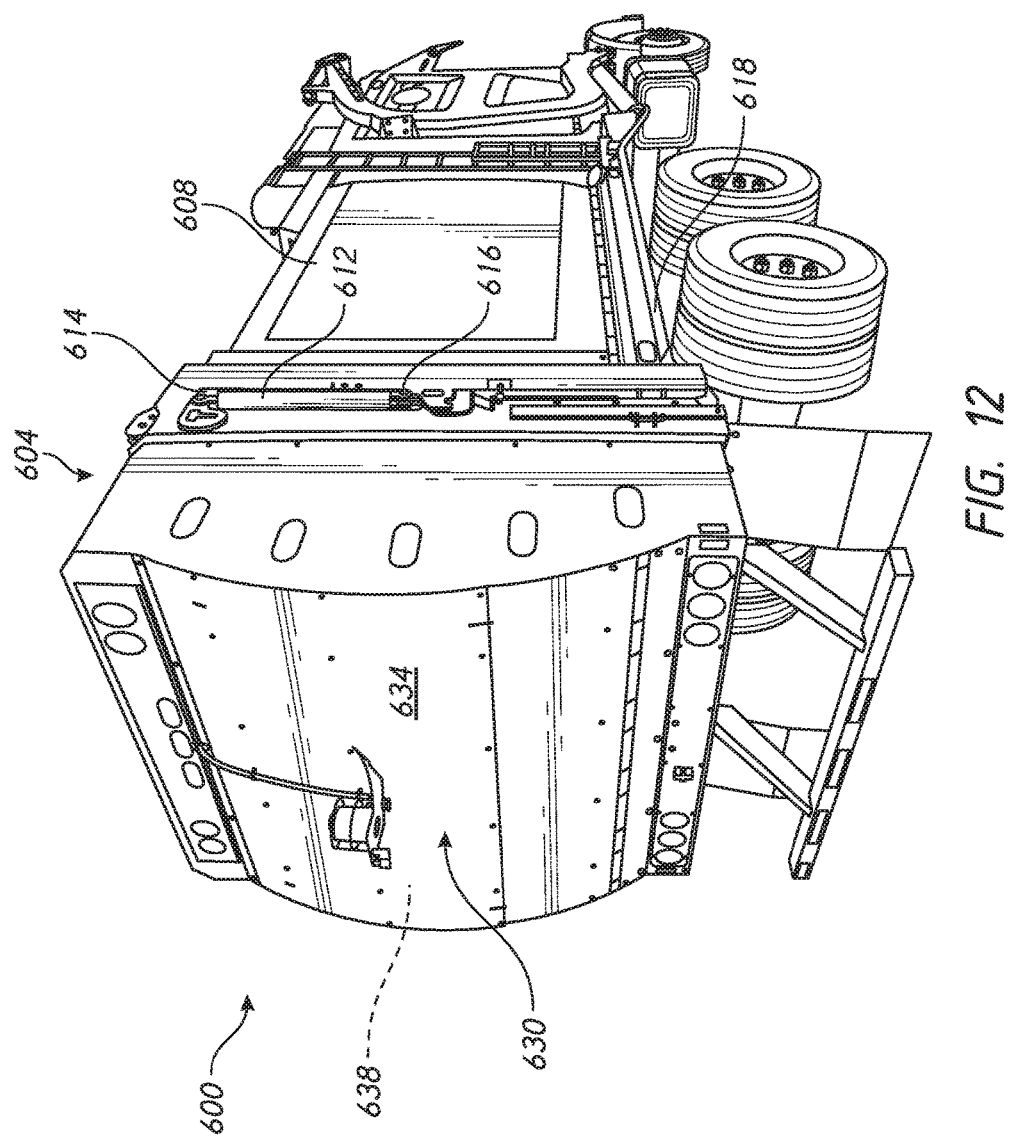
FIG. 12 shows a garbage truck with a tail-gate mounted fluid storage system.

FIGS. 12 and 13 show additional features of a vehicle 600 having a fluid system 630. The vehicle 600 can be a refuse truck. The vehicle 600 can have any of the features of the vehicle 500. The vehicle 600 can have a tailgate 604. The tailgate 604 can be configured to open and close, such as to provide access to internal contents of a shell 608. A hydraulic actuator 612 can be used to open and close the tailgate 604. In particular, the actuator 612 can be coupled at a first end 614 to the tailgate 604 and at a second end 616 to a chassis 618 of the vehicle 600. The second end 616 can be connected directly or indirectly to the chassis 618.

The fluid system 630 is mounted to the tailgate 604. The fluid system 630 includes a cowling 634 enclosing a space 638 in which at least some of the components of the system 630 reside. Some of the components of the fluid system 630 that are disposed within the space 638 are shown in FIG. 13. In particular, the fluid system 630 includes a frame assembly 642 that is disposed at least partially within the cowling 634. The frame assembly 642 is coupled with and is supported by the tailgate 604. The connection can be any suitable connection such as one or a plurality of brackets. The frame assembly 642 is coupled with and supports, in one embodiment, one or a plurality of fuel pressure vessels 648. The frame assembly 642 is coupled with and supports, in one embodiment, one or a plurality of auxiliary fluid vessels 652. The auxiliary fluid vessels 652 can include gas fluid vessels. The auxiliary fluid vessels 652 can include pressure vessels. The auxiliary fluid vessels 652 can include gas pressure vessels. The support of the auxiliary fluid vessel(s) 652 can be by any suitable support structure such as a bracket on each end or a support block or block assembly as discussed above. The auxiliary fluid vessels 652 are compactly arranged within the cowling 634, e.g., are nested within the space partially defined by two adjacent vessels 648.

The auxiliary fluid system 630 at least partially disposed in a cowling also includes one or a plurality of fluid conduits 660 configured to convey fluid from within the fluid vessel(s) 652 to a fluid port or a junction 664. The port 664 can include a point at which fluid supply from a plurality of fluid vessels 652 merges or can include two separate connection points so that one of a plurality of fluid vessels 652 can power a first system or component and another of the plurality of fluid vessels 652 can power a second system or component. In the illustrated embodiment the vessels 652 supply fluid through fluid conduits 660 to a merged conduit 672 that supplies fluid to the actuator 612 upon pressing of a controller 676. Upon pressing the controller 676, which can be a control button, the actuator 612 can be lengthened extending the distance between the first end 614 and the second end 616. Because the second end is secured (directly or indirectly) to the chasses 618 the tailgate 604 is moved away from the rearward portion of the shell to expose its volume and any contents therein.

The fluid vessels 652 could power other or additional components. The fluid vessels 652 could actuate a compactor disposed in the shell through a second actuator similar to the hydraulic actuator 528. The fluid vessels 652 could power an air horn, brakes or other fluid system of the vehicle 600.

Side-Mounted Systems

Figure 15:
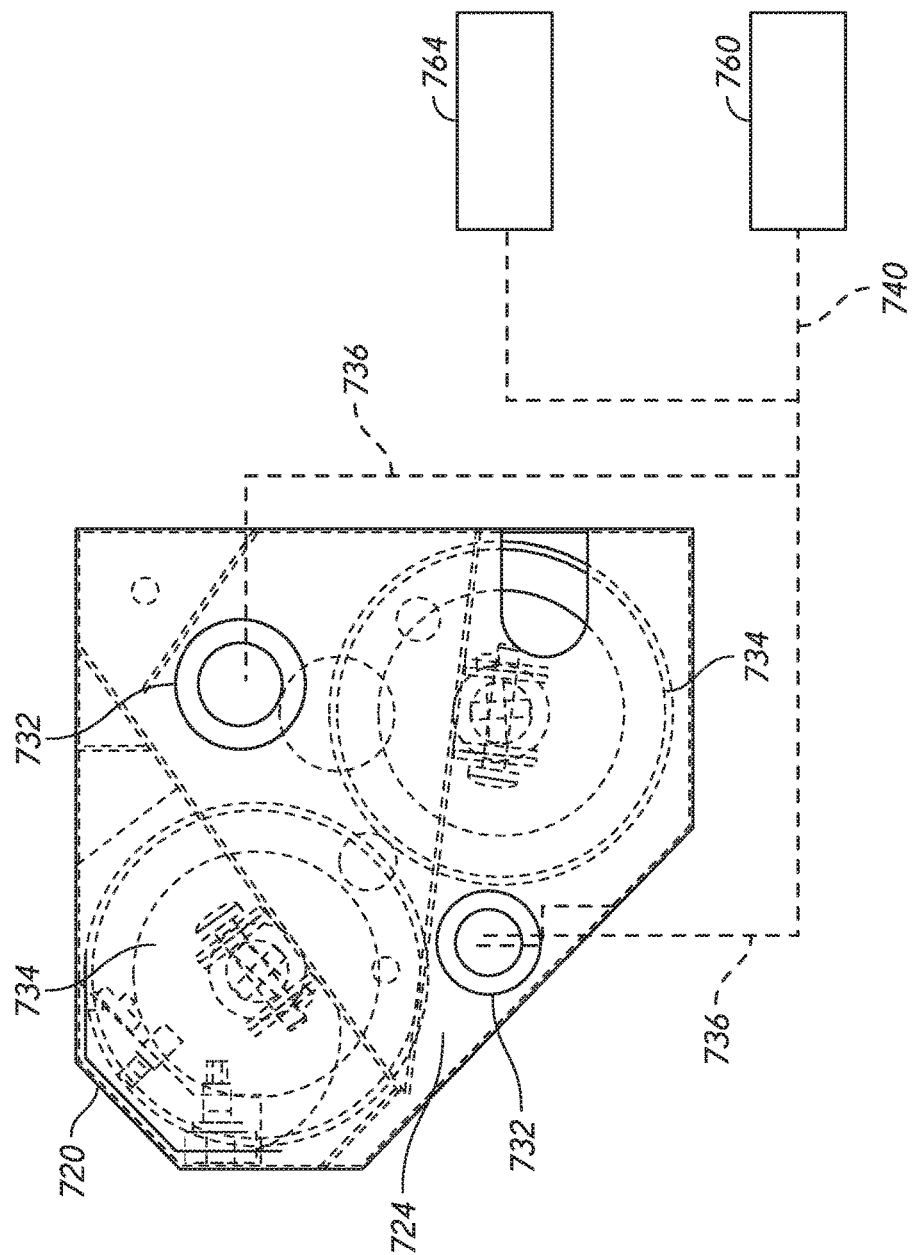
FIG. 15 is a cross-section of the side mounted system of FIG. 14.

FIGS. 15 and 16 illustrate another fluid system 704 that could be coupled with a vehicle 700. The vehicle 700 includes a frame member 712 to which the system 704 is mounted. The vehicle 700 can have a system 704 mounted to the frame member 712 on each side of the vehicle. The system 704 includes a cowling 720 that is disposed around a space 724 in which an auxiliary fluid vessel 732 can be disposed. In the illustrated embodiment, two auxiliary fluid vessels 732 are disposed in the space 724 surrounded by the cowling 720. The auxiliary fluid vessels 732 are compactly arranged within the cowling 720, e.g., are nested within the space partially defined by two adjacent vessels 734 as shown in FIG. 15. Fluid conduits 736 disposed at least partially in the cowling 720 convey the fluid between the fluid vessels 732 and a component 760 of the vehicle 700 that is powered by or otherwise uses the fluid. The fluid conduits 736 can communicate independently with the component 760 or with two or more components 760. The fluid conduits 736 can merge at a valve or junction to a single conduit 740 to communicate with one or more components 760.

In the illustrated embodiment a controller 764 is provided to control fluid flow in the conduit 736 and/or the conduit 740. Upon pressing the controller 764, which can be a control button, the component 760 is pressurized, powered or otherwise supplied with the fluid form the fluid vessel(s) 732. The component 760 can be any of the components disclosed herein or other similar auxiliary components or systems of the vehicle.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication.

What is claimed is:

1. A vehicle fluid storage system, comprising:
   a frame assembly comprising a lower portion and an upper portion, the lower portion comprising a plurality of brackets configured to couple the frame assembly with a chassis of a vehicle,
   the upper portion comprising first and second upright frames, the first and second upright frames being disposed on opposite lateral sides of the frame assembly and each comprising a fuel pressure vessel support and an auxiliary fluid pressure vessel support, the auxiliary fluid pressure vessel support being spaced apart from the fuel pressure vessel support;
   a fuel pressure vessel coupled with the fuel pressure vessel support of the first upright frame and with the fuel pressure vessel support of the second upright frame, the fuel pressure vessel configured to be filled with a combustible gas fuel;
   an auxiliary fluid pressure vessel coupled with the auxiliary fluid pressure vessel support of the first upright frame and with the auxiliary fluid pressure vessel support of the second upright frame, the auxiliary fluid pressure vessel configured to be filled with an auxiliary fluid; and
   an auxiliary fluid manifold having a first end fluidly coupled with an internal volume of the auxiliary fluid pressure vessel and a second end fluidly coupled with an auxiliary fluid port to be coupled with a pneumatic or hydraulic system of the vehicle.

2. The vehicle fluid storage system of claim 1, wherein the first and second upright frames comprise a front-to-back profile configured to enable the frame assembly to be disposed between a cab of a tractor unit and a semi-trailer unit of a truck.

3. The vehicle fluid storage system of claim 1, further comprising a plurality of fuel pressure vessel supports on each of the first upright frame and the second upright frame to support a plurality of fuel pressure vessels in a compact array.

4. The vehicle fluid storage system of claim 3, wherein a first fuel pressure vessel support is disposed at a first elevation and a second fuel pressure vessel support is disposed at a second elevation above the first fuel pressure vessel support, the auxiliary fluid pressure vessel support being disposed at a third elevation between the first elevation and the second elevation.

5. The vehicle fluid storage system of claim 3, further comprising a cowling configured to be disposed around the frame assembly and between a cab of a tractor unit and a semi-trailer unit of a truck, wherein the auxiliary fluid pressure vessel is disposed within the cowling.

6. The vehicle fluid storage system of claim 1, wherein the auxiliary fluid pressure vessel is nested between arcuate sides of adjacent fuel pressure vessels.

7. The vehicle fluid storage system of claim 1, further comprising a cowling enclosing the frame assembly;

wherein the auxiliary fluid manifold has a first length coupled with the upper portion of the frame assembly and an outlet accessible through an aperture in the cowling.

8. The vehicle fluid storage system of claim 1, wherein the auxiliary fluid manifold comprises a plurality of outlets for supplying auxiliary fluid to two or more pneumatic or hydraulic components.

\* \* \* \* \*